Patented June 6, 1939

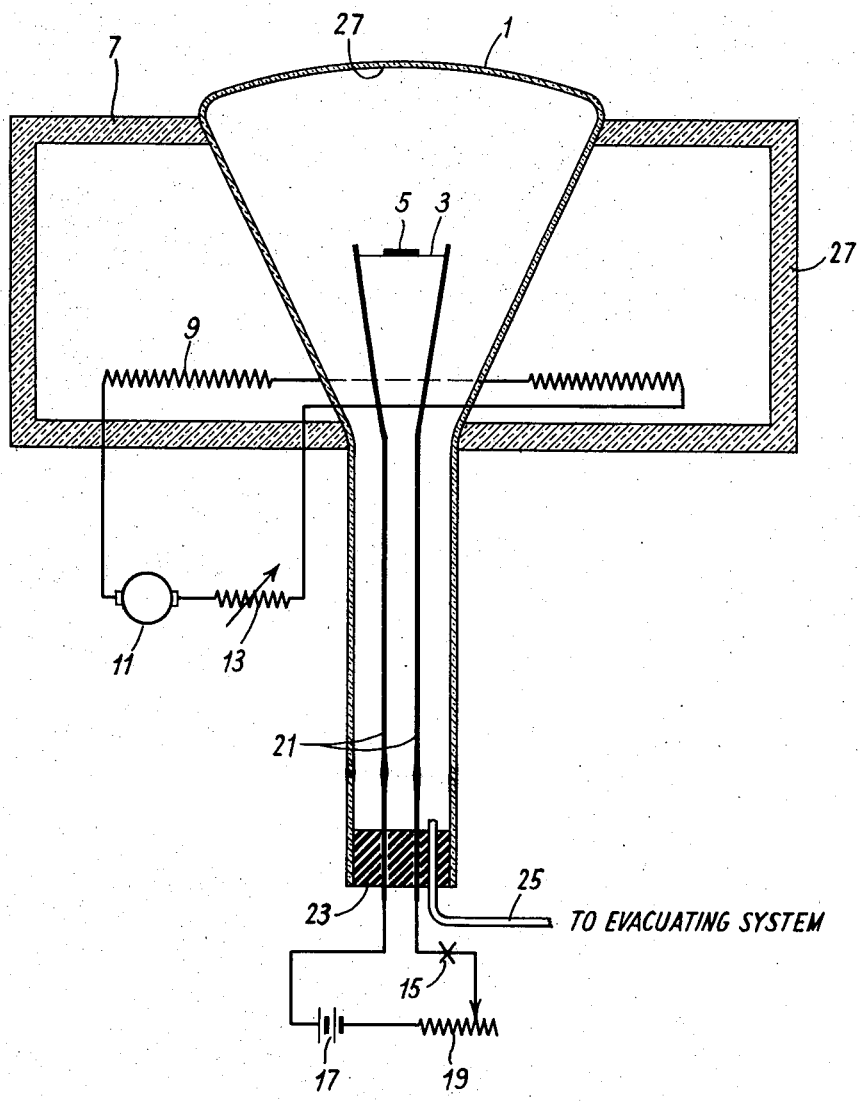

2,161,458

UNITED STATES PATENT OFFICE 2,161,458

LUMINESCENT SCREEN

Jan Hendrik de Boer and Marten Cornelis Teves, Eindhoven, Netherlands, assignors to N. V. Philips' Gloeilampenfabrieken, Eindhoven, Netherlands Application September 22, 1936, Serial No. 101,912
In Germany May 29, 1935

8 Claims. (Cl. 250—27.5)

This invention relates to a luminescent screen and to a method of manufacturing such screens.

For manufacturing such screens often binding agents are used which are provided on a support either before applying the luminescent material or mixed with the luminescent material. The use of these binders such as water-glass entails the drawback of gases being often set free by them afterwards. This also applies for organic binding agents which have the additional drawback of having a very detrimental influence on the luminescent material.

When making the screens without using a binding agent in order to avoid these difficulties, the adhesive capacity to the substratum consisting, for instance, of glass or metal, is insufficient as a rule.

To overcome this deleterious feature of preparation of luminescent screens, we provide in a simple and efficacious manner a surface which is exceedingly rough when compared to the size of the luminescent particles, which are to be deposited thereon. Since charges accumulate on luminescent screens under electronic or ionic bombardment, our invention serves to give the further advantage of producing a relatively high conducting path to redistribute the charges accumulated during the bombardment.

Accordingly, it is one of the objects of our invention to provide an improved luminescent screen.

It is a further object of our invention to provide a luminescent screen which shall be firmly fastened to a glass surface.

Another object of our invention is to provide substantially transparent substratum of a luminescent screen which shall have relatively good electrical conducting properties.

Still another object of our invention is to provide means for mounting luminescent materials, which means for mounting shall not release gases during bombardment by electrons or ions.

Other and ancillary objects will appear to those skilled in the art upon a consideration of the specification, together with the drawing, which shows one form in which our invention may be practiced.

It has been found that when using luminescent screens according to the present invention, a high adhesive capacity is ensured. In order to provide the luminescent material with these screens a film consisting of one or more inorganic oxides, or fluorides is applied, this film being obtained by vaporization and precipitation. Advantageously one or more of the oxides or fluorides of beryllium, aluminium, silicon, magnesium and so forth are used.

Referring now to the drawing, our invention will be described in detail. The tube blank 1 in which the luminescent screen is to be affixed, is placed in a heating chamber 7 so as to expose the end wall upon which the screen is to be mounted and also to expose the long neck-like portion of the tube. The heating chamber is lined with a heating insulating material 27 such as asbestos, rock wool, or similar substance. Within the chamber electrical heating units 9 are formed from resistance wires such as chromel or alumel, or other similar high temperature wire.

Suitable leads from these resistance units are connected to a source of electrical energy 11 in series with a variable resistance 13 which serves to control the amount of energy supplied to the heating coils. The source of electrical energy 11 may be a D. C. generator as shown diagrammatically in the drawing, or it may be a source of alternating current. Where alternating current is used for heating the resistance 13 may be replaced by a tape transformer or auto-transformer for varying the voltage applied to the heating coils. From the neck-like portion of the tube blank is supported tight fitting stopper 23. The stopper serves to carry a pair of relatively stiff lead wires 21 as well as a piece of tubing 25. The ends of the leads projecting into the atmosphere are connected to a source of potential 17, in series with a variable resistance 19 and a switch 15. Within the tube and fastened to the leads 21 is a piece of high refractory metallic wire 3, such as tungsten, and affixed to the tungsten may be one of the oxides or fluorides 5 of the kind described above. The stopper 23 also supports a piece of tubing 25 which is led to an evacuating system, such as the kind well known to the art, for producing a vacuum on the order of $10^{-6}$ mm. of mercury. When the system has been evacuated to this pressure, the switch 15 is closed and the resistance 19 varied to render the filament 3 hot enough to cause vaporization of the oxide or fluoride 5. Since the body of the tube is maintained at a temperature relatively high to the exposed surface, the particles of the vaporized material settle upon the face 27. Where it is desired, the face 27 may be cooled by directing a jet of air against it, thereby increasing the temperature gradient so as to make more sure that the vaporized material 5 will settle along the face 27 and substantially there only. The thickness of the deposit should be such as to be transparent, while providing a uniform surface.

Under these conditions a surface which is rough enough to firmly hold the particles of luminescent materials is provided, while at the same time the conductivity is maintained high enough to take care of the charges developed during bombardment without any substantial loss in light.

After such a film has been provided by vaporization the luminescent material such as calcium tungstate, zinc silicate, cadmium tungstate, zinc sulphide, mixtures of zinc sulphide and cadmium sulphide and so on can be applied by causing it to deposit from a suspension, for instance, in alcohol, hexane or benzene. After removing the liquid excess there is dried and, if necessary, heated.

It has been found that with screens which are brought to luminescence by impinging electrons or ions and with which the luminescent material is provided on metal layers, the oxide films under the luminescent material do not form an excessive resistance for carrying off the charge during the electron or ion bombardment.

We have found that it is particularly advantageous to use the present invention when a thin metal layer transparent to light is provided under the luminescent material.

Having described our invention, what we claim is:

1. The method of preparing a luminescent screen which comprises the steps of vaporizing a relatively good electrically conducting oxide on to a supporting surface and subsequently depositing luminescent material upon the vaporized oxide.

2. The method of forming a luminescent screen upon a glass wall which comprises the steps of vaporizing a relatively good electrically conducting oxide onto the glass wall to form a layer thereon, and subsequently depositing luminescent material upon the formed layer.

3. The method of forming a luminescent screen which comprises vaporizing a relatively good electrically conducting compound chosen from the group consisting of the oxides and fluorides of an element chosen from the Third Series of the Periodic Table onto a supporting surface to form a layer thereon, and substantially depositing luminescent material upon the formed layer.

4. The method of forming a luminescent screen upon a glass wall, which comprises the steps of vaporizing a relatively good conducting metallic fluoride onto the glass wall to form a layer thereon, and subsequently depositing luminescent material upon the formed layer.

5. The method of forming a luminescent screen upon a glass wall which comprises the steps of vaporizing a relatively good conducting metallic oxide chosen from the Third Series of the Periodic Table onto the glass wall to form a layer thereon, and subsequently depositing luminescent material upon the formed layer.

6. A luminescent screen comprising a supporting surface, a transparent layer of a vaporized compound having relatively good electrical conductivity chosen from the group consisting of oxides and fluorides of an element of the Third Series of the Periodic Table, and a layer of metallic inorganic cathodo-luminescent material supported on the said transparent layer.

7. A luminescent screen comprising a supporting surface, a transparent layer of relatively good electrically conducting oxide of a metal on the supporting surface and a layer of cathodo-luminescent inorganic metallic compound supported on said transparent layer.

8. A luminescent screen comprising a supporting surface, a transparent layer of relatively good electrically conducting fluoride of a metal deposited upon said supporting surface, and a layer of cathodo-luminescent inorganic metallic compound supported on said transparent layer.

JAN HENDRIK DE BOER.
MARTEN CORNELIS TEVES.